US006863309B1

(12) United States Patent
Shulman

(10) Patent No.: US 6,863,309 B1
(45) Date of Patent: Mar. 8, 2005

(54) APPARATUS FOR INCREASING TRANSACTION EFFICIENCY IN A MULTIPLE CLIENT ENVIRONMENT AND METHOD OF FABRICATION THEREOF

(76) Inventor: Nathan Shulman, 6705 Danwood Dr., Austin, TX (US) 78759

( * ) Notice: Subject to any disclaimer, the term of this patent is extended or adjusted under 35 U.S.C. 154(b) by 3 days.

(21) Appl. No.: 10/035,953

(22) Filed: Dec. 26, 2001

(51) Int. Cl.[7] .............................................. B42D 15/00
(52) U.S. Cl. .......................................... 283/57; 283/65
(58) Field of Search ........................... 283/56, 60.1, 57, 283/60.2, 65, 904, 72, 17; 379/144; 235/379, 380, 375

(56) References Cited

U.S. PATENT DOCUMENTS 5,746,451 A * 5/1998 Weyer .......................... 283/65
5,762,376 A * 6/1998 Taskett ......................... 283/65
6,089,611 A * 7/2000 Blank ........................... 283/67

* cited by examiner

Primary Examiner—Willmon Fridie, Jr.

(57) ABSTRACT

An apparatus for facilitating a transaction is disclosed. In one form, a transaction facilitator includes a rear panel sized relatively close to a currency card. The front panel is coupled to the rear panel and includes a width slightly greater than the rear panel. The front panel is coupled to the rear panel at a distance from the rear panel to secure the currency card. The front panel further includes a height slightly less than the rear panel and an aperture positioned relative to allow viewing of a portion of the currency card. A fold is coupled to the rear panel to secure the front panel to the rear panel at a position relative to the aperture to display information associated with the currency card.

37 Claims, 4 Drawing Sheets

APPARATUS FOR INCREASING TRANSACTION EFFICIENCY IN A MULTIPLE CLIENT ENVIRONMENT AND METHOD OF FABRICATION THEREOF

TECHNICAL FIELD

The present invention generally relates to processing transactions and, more particularly, to an apparatus for increasing transaction efficiency and method of fabrication thereof.

BACKGROUND OF THE INVENTION

Transactions made by two or more purchasers often result in a complicated and time-consuming process for both the purchaser(s) and purveyor of goods or services. The seller initiates a transaction by providing a bill, usually in a small folder, called a "presenter". Most businesses accept several different forms of currency, which may lead to a complicated process for completing a transaction in a multiple client environment. For example, a party of three may request to pay for a bill using cash and two different credit cards. Such a request may leave the purveyor and/or the individuals with determining and remembering which amount to charge to each credit card.

Some purchasers may resort to using an ad hoc system of combining multiple forms of currency to reach the total amount of the purchase price including other fees, such as gratuity and miscellaneous service charges. The purchasers may then place the resulting cash and credit cards in a tray or a presenter. Once this process is completed, the merchant must use an ad hoc system to remember which amounts are to be allocated to which currency by writing notes, committing the allotments to memory, or using visual clues such as the color of the cards. Many possible errors may be encountered, prolonging the process and decreasing the overall efficiency of the business transaction.

SUMMARY OF THE INVENTION

In accordance with teachings of the invention, an apparatus for increasing bankcard payment efficiency and method of fabrication thereof is provided. According to one aspect of the invention, an apparatus for facilitating a transaction in a multiple client transaction environment. The apparatus includes a front panel including an aperture to display a currency associated with a transaction and a rear panel coupled to the front panel. The rear panel includes printed information positioned relative to the aperture. The apparatus further includes a transaction ledger operable to record information associated with the currency and the transaction.

According to another aspect of the invention, a method of fabricating a transaction facilitator is disclosed. The method includes identifying a first panel including an aperture region and printing information on the first panel at a location relative to the aperture region. The method further includes printing information on a second panel at a location relative to the first panel and coupling the first panel and the second panel based on the identified aperture region and at a distance operable to house a when currency placed within the transaction facilitator.

According to a further aspect of the invention, an apparatus for facilitating a transaction is disclosed. The apparatus includes a rear panel sized relatively close to a currency card and a front panel coupled to the rear panel. The front panel includes a width slightly greater than the rear panel and spaced at a distance from the rear panel to secure the currency card. The apparatus further includes the front panel including a height slightly less than the rear panel and an aperture positioned relative to allow viewing of a portion of the currency card. The apparatus includes a fold coupled to the rear panel and operable to secure the front panel to the rear panel at a position relative to the aperture to display information associated with the currency card.

It is an object of the invention to provide an apparatus for increasing transaction efficiency in a multi-client transaction environment.

It is another object of the invention to provide a medium to present promotional material to consumers in association with a transaction.

It is a further object of the invention to provide a low-cost apparatus for expediting transactions in a multi-client environment.

It is a further object of the invention to increase the overall throughput and sale of goods and services through efficient processing of transactions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
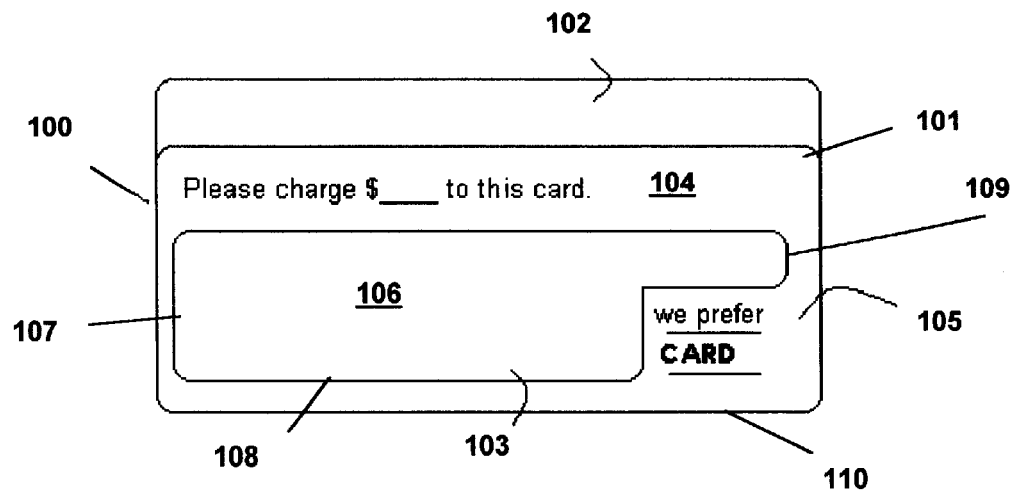
FIG. 1 illustrates a front perspective view of a transaction facilitator according to one aspect of the invention.

Advantageous embodiments of the invention are illustrated in FIGS. 1–7 and provide an apparatus for increasing bankcard payment efficiency of transactions in a multiple client environment. FIG. 1 illustrates a front perspective view of a transaction facilitator according to one aspect of the invention. A transaction facilitator, illustrated generally at 100, includes a front panel 101 coupled to a rear panel 102 to provide a sleeve or opening (not expressly shown) for inserting a currency such as cash, a credit card, a bankcard, a debit card, a bank draft, etc. during a transaction. Front panel 101 includes an aperture 103 at a position relative to information associated with a type of currency. For example, information such as a card holder name, a credit card number, expiration date, etc. associated with a credit card may be displayed through aperture 103. As such, a bankcard or credit card inserted into transaction facilitator 100 may be easily identified during a transaction.

Front panel 101 may be coupled to rear panel 102 using several different coupling mechanisms. For example, an adhesive substance (not expressly shown) may be placed along a portion of front panel 101 and second panel 102 at one or more positions that may provide coupling while not be obtrusive for inserting or removing a currency such as a bankcard, credit card, etc. For example, front panel 101 and rear panel may be sized to allow for coupling front panel 101 to rear panel 102 using an adhesive positioned on a rear portion of front panel 101 (not expressly shown).

Transaction facilitator 100 further includes a transaction ledger 104 for allowing a client, customer, user, etc. to write a transaction amount associated with a transaction. A logo region 105 may include a logo of a merchant transaction sponsor such as Visa, Master Card, American Express, etc. For example, a transaction sponsor (i.e. Visa, Master Card, etc.) may provide business owners transaction facilitator(s) 100 including a logo printed in logo region 105. In another embodiment, logo region 105 may be realized as an aperture operable to allow a merchant to view a logo associated with a bankcard, credit card, etc. inserted into transaction facilitator 100.

Transaction facilitator 100 further includes a promotional region 106 viewable through aperture 103 when using a currency is not present within transaction facilitator 100. For example, promotional region 106 may include a message thanking a consumer for their patronage. In another embodiment, promotional region 106 may include an advertisement of a third party product or service, a promotion of a new product, or any other type of information viewable through aperture 103. For example, transaction facilitator 100 may include a tip calculator within promotional region 106 for assisting individuals with calculating gratuity. As such, several types of information may be printed on rear panel 102 relative to aperture 103 for viewing during use of transaction facilitator 100.

Transaction facilitator further includes aperture 103 having a first vertical edge 107, a second vertical edge 109 about logo region 105, and a lower horizontal edge 108 extending there between. In one embodiment, first vertical edge 107 and second vertical edge 108 may extend to a bottom edge 110 associated with providing a lower portion of transaction facilitator 100. For example, first vertical edge 107 and second vertical edge 108 may extend to bottom edge 110 such that aperture 103 extends to bottom edge 110. In this manner, aperture 103 may be used to view a currency such as a credit card, bankcard, etc. while transaction facilitator 100 may have a width operable to house and support a credit card, bank card, etc. when placed within. As such, transaction facilitator 100 may not include material along a portion of bottom edge 110 with aperture 103 extending to bottom edge 110.

During use, a business owner may provide transaction facilitator 100 to one or more clients for facilitating a multiple client transaction. For example, a restaurant may provide transaction facilitator 100 to multiple clients or customers seated at the same table and requesting to pay for a bill using different types of currency. For example, a party of six may request to pay for a bill using four different credit cards and cash. A waitperson may provide four transaction facilitators 100 thereby allowing each user to enter an amount allocated to their portion of the bill. As such, a consumer may write an amount within transaction ledger 104. In this manner, a waitperson and each individual could efficiently ascertain an amount to charge to a credit or debit card placed within transaction facilitator 100. In one embodiment, transaction ledger 104 may include a tip region 107 allowing a user to enter a tip amount for a waitperson. In this manner, a waitperson or restaurant may initiate the total amount of a transaction for a credit card/debit card thereby reducing the number of steps needed for a credit/debit transaction.

Figure 2:
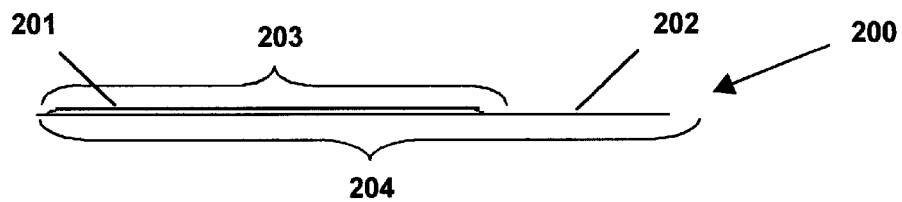
FIG. 2 illustrates a side perspective view of a transaction facilitator according to one aspect of the invention.

FIG. 2 illustrates a side perspective view of a transaction facilitator according to one aspect of the invention. A transaction facilitator, illustrated generally at 200, includes a front panel 201 coupled to a rear panel 202 such that a sleeve is provided for holding a currency (not expressly shown). Front panel 201 includes an associated front panel height 203 and rear panel 202 includes an associated second panel height 204. First panel height 203 is provided at a distance less than second panel height 204 for allowing easy insertion and removal of a currency such as a bankcard, a credit card, cash, a bank draft, etc.

In one embodiment, front panel height 201 is dimensioned slightly less than rear panel height 202 and at a dimension relative to a height associated with a magnetic strip for a bankcard/debit card. Additionally, rear panel height 204 may be sized close to or slightly larger than a conventional debit/credit card. In this manner, during use rear panel 202 may be slightly bent to allow access to a magnetic strip for initiating a credit/debit card transaction.

Figure 3:
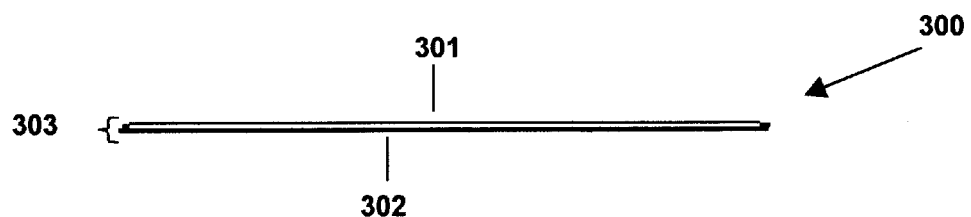
FIG. 3 illustrates a top perspective view of a transaction facilitator according to one aspect of the invention.

FIG. 3 illustrates a top perspective view of a transaction facilitator according to one aspect of the invention. A transaction facilitator, illustrated generally at 300, include a front panel 301 coupled to a rear panel 302 at a width 303 for allowing easy insertion, retention, and removal of a currency such as a bankcard. For example, width 303 may be sized relative to an average thickness of a conventional credit/bankcard such that a conventional credit/bankcard may be efficiently inserted and removed without destroying transaction facilitator 300. In one embodiment, one or more portions of transaction facilitator 300 may include a material operable to allow efficient insertion and removal of a bank/credit card. For example, an interior surface (not expressly shown) front panel 301 and/or second panel 302 may include a material for promoting easy insertion of bank/debit cards. In another embodiment, only one interior surface may include a material to promote easy insertion/removal of a bank/credit card. Additionally, one surface may include a material to help promote retention of a card within a transaction facilitator. As such, one or more combinations of materials may be used for providing transaction facilitator 300.

In one embodiment, front panel 301 may include an aperture (not expressly shown) covered with a transparent or semi-transparent material such as a thin plastic, cellophane, etc. operable to enhance insertion and removal of a currency through while enabling a user to view a currency upon being inserted within transaction facilitator 300. For example, a transparent or semi-transparent material may be coupled to an inside surface of front panel 301 and may help facilitate efficient insertion and removal of a currency such as a credit card, bankcard, etc. by reducing snagging that may be caused by a surface or edge of an aperture.

Transaction facilitator 300 may be made of one or more types of material. For example, transaction facilitator 300 may be made of a disposable material such as paper and/or other biodegrading type materials. As such, a user may dispose of transaction facilitator 300. In another embodiment, transaction facilitator 300 may be made of a reusable material such as a plastic, a highly durable paper product, leather or leatherette material, or other materials that may provide increase durability for prolonged reuse.

For example, transaction facilitator 300 may include a reusable transaction ledger (not expressly shown) operable to allow a user to erase, wipe, clean, etc. information written within a transaction region of transaction facilitator 300.

In another embodiment, several transaction facilitator(s) 300 may be provided via a single sheet or material. For example, a single sheet may include four transaction facilitator(s) 300 allowing a waitperson to present a single sheet of transaction facilitator(s) 300 to a party of four for facilitating a transaction.

Figure 4:
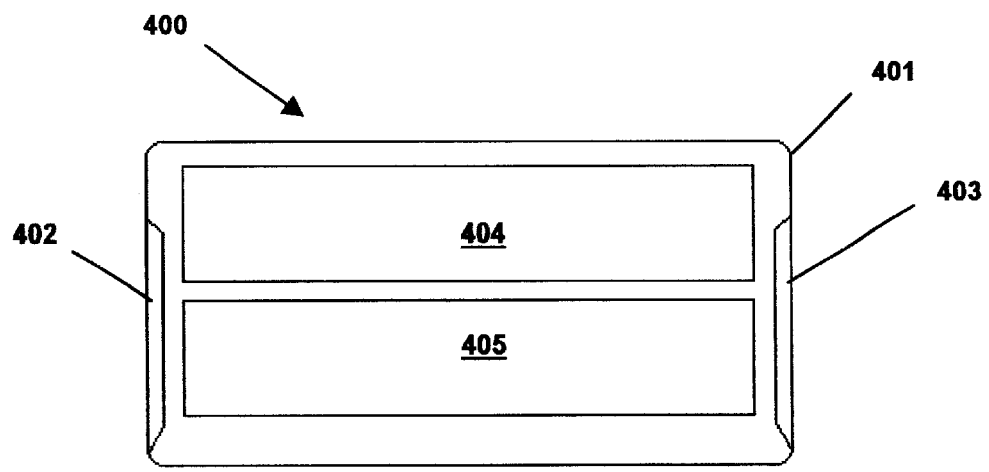
FIG. 4 illustrates a rear perspective view of a transaction facilitator according to one aspect of the invention.

FIG. 4 illustrates a rear perspective view of a transaction facilitator according to one aspect of the invention. A transaction facilitator, illustrated generally at 400, includes a rear panel 401 coupled to a front panel 402 including a first fold 401 and a second fold 402 operable to couple a front panel to a rear panel for providing a housing for a bankcard (not expressly shown). Transaction facilitator 401 further includes an advertisement region 404 for displaying a promotion and a coupon region 405 for displaying a discount such as a coupon or sales promotion.

First fold 402 and second fold 403 may be coupled to rear panel 403 using one or more of coupling mechanisms. For example, a coupling mechanism may include an adhesive operable to couple first fold 401 and second fold 402 to rear panel 403. An adhesive may be provided on one or more surface(s) of first fold 402, second fold 403, and/or rear panel 401.

In another embodiment, first fold 402 and second fold 403 may be coupled to rear panel 403 using a coupling mechanism operable into be inserted to a portion of rear panel 403. For example, rear panel 403 may include a slot operable to receive first fold 402 and second fold 403 for securing a front panel to rear panel 403. First fold 402 and second fold 403 may be sized such that each fold may be easily inserted within a slot (not expressly shown) associated with rear panel 403. In this manner, transaction facilitator 400 may be easily assembled without the use of adhesives that may present an environmental hazard. Other coupling mechanisms may also be used for providing transaction facilitator 400.

Figure 5:
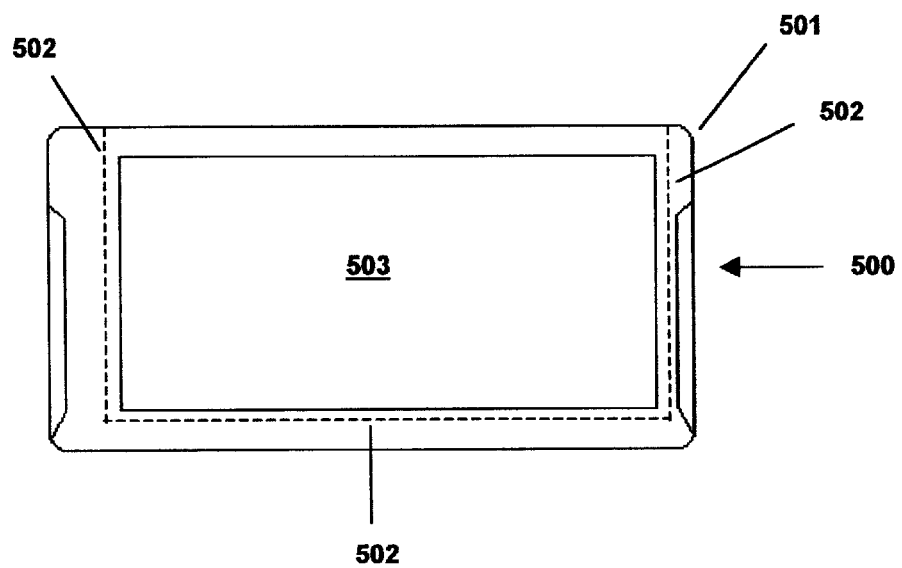
FIG. 5 illustrates a rear perspective view of a transaction facilitator according to another aspect of the invention.

FIG. 5 illustrates a rear perspective view of a transaction facilitator according to another aspect of the invention. A transaction facilitator, illustrated generally at 500, includes a rear panel 501 having a perforated section 502 and an advertisement region 503 for displaying an advertisement such as a coupon, contact information such as telephone number of a restaurant for ordering to go food, or other information as needed.

During use, a user may remove advertising region using perforated region 502 by removing advertisement region 503 from transaction facilitator along perforated region 502. In this manner, a user may retain a portion of transaction facilitator 500. For example, transaction facilitator 500 may include printed information such as a coupon or contact information for a restaurant on one portion of rear panel 501 and a second form of information on the opposite side of rear panel 501. For example, a tip calculator may be provided on one surface of rear panel 501 and a restaurant's contact information may be provided on a second surface of rear panel 501. In this manner, a restaurant may obtain repeat advertising each time a user calculates a tip. For example, a rear panel may include a tip calculate that is viewable through an aperture associated with a front panel (not expressly shown) of transaction facilitator 500. Additionally, contact information for the restaurant may be provided in a region that is not viewable until rear panel 503 is removed along perforated region 502. For example, a user may remove advertising region 503 to reveal a 'prize' such as a free appetizer or drink coupon that may be viewed upon removing rear panel 501 along perforated region 502. In this manner, a restaurant may obtain repeat business through direct marketing individuals with redeemable coupons. Several combinations of advertisements and information may be printed on the removable panel of rear panel 501 allowing a user to remove advertising region 503.

In one embodiment, transaction facilitator 500 may include a removable promotional area (not expressly shown) coupled to rear panel 501 using an adhesive operable to maintain a removable advertisement, business card, coupon, promotion, etc. coupled to rear panel 501. In this manner, perforated region 503 may not be needed to provide a removable portion of transaction facilitator 500. For example, an adhesive that is strong enough to allow a removable material to be coupled to rear portion 503 while allowing a removable material to be easily removed may be used to couple a removable promotional area.

Figure 6:
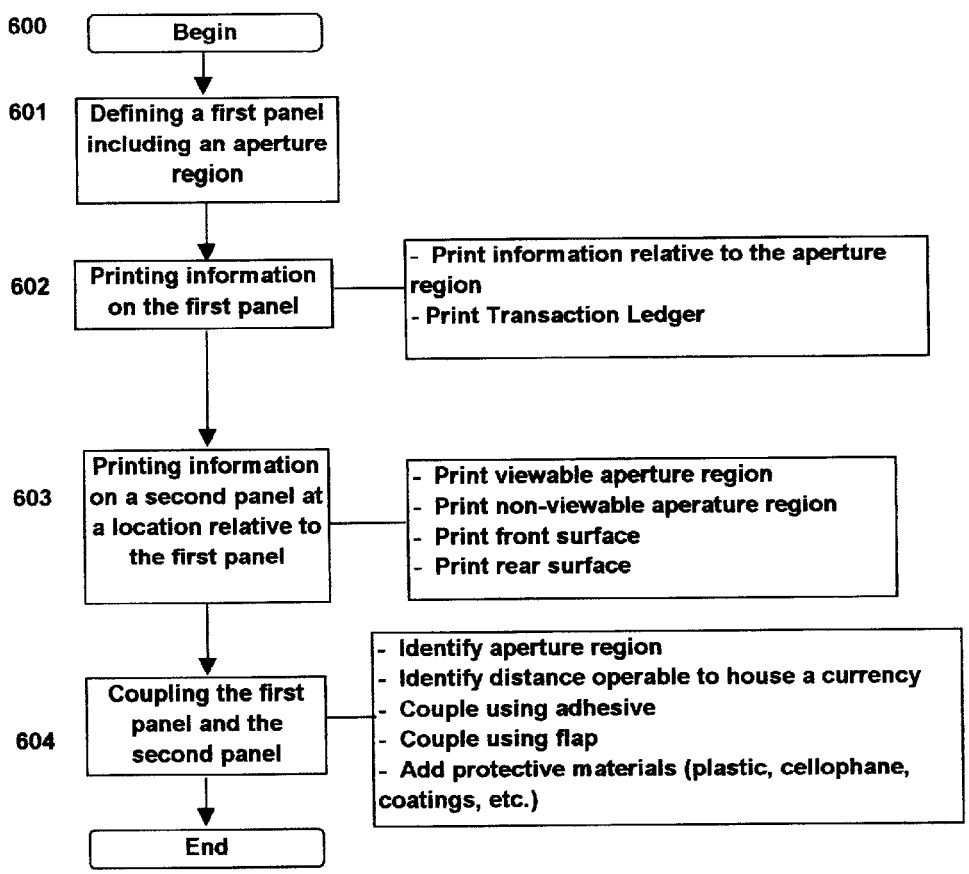
FIG. 6 illustrates a flow diagram of a method for fabricating a transaction facilitator according to one aspect of the invention.

FIG. 6 illustrates a flow diagram of a method for fabricating a transaction facilitator according to one aspect of the invention. The method begins generally at step 600. At step 601, a first panel is identified including an aperture region. The method proceeds to step 602 where information is printed on the first panel at a location relative to the aperture region. For example, a user may not want to print information at a location where an aperture is provided and as such would print information relative to where the aperture is defined. Upon printing the first portion, the method proceeds to step 603 where information is printed on a second panel at a location relative to the first panel. For example, a user may want to print information to be displayed on a back surface of the second panel and as such may print information in an orientation to allow viewing. In another embodiment, information may be printed on a second surface of the defined second region relative to where the aperture is located. In this manner, printed information may be displayed based on the relative position of the aperture.

Upon printing the second region, the method proceeds to step 604 where the first panel and the second panel are coupled based on the identified aperture region and at a distance operable to house a currency when placed within the transaction facilitator. For example, the first panel may be coupled to the rear panel using an adhesive or other coupling mechanism such that a conventional bankcard may be securely inserted within the transaction facilitator. In one embodiment, the first panel and the second panel may be coupled to allow information printed on the second panel to be displayed (or not) by the aperture.

In one embodiment, the first panel is coupled to the second panel to form a cavity for housing a currency card such as a conventional bankcard, debit card, credit card, etc. For example, one or more portions may include predefined regions to couple the first and second panel to provide housing for a bankcard. For example, first panel may include a width greater than the second panel such that a portion of the first panel may be folded about the second panel and coupled to the back surface of the second panel. As such, an adhesive may be located on the back portion of the second panel relative to the fold of the first panel and/or on the fold portion to allow coupling. In another embodiment, an adhesive tape may also be used to couple the first panel and the second panel. Other coupling mechanisms may also be used. For example, the rear panel may include two slots positioned relative to a fold associated with the front panel. Additionally, the fold may be formed slightly smaller than the slot for easy insertion into the slot. Each fold may also be formed such that upon insertion into the slot the fold points in a downward direction such making the fold unobtrusive during insertion and removal of currency from the transaction facilitator.

In one embodiment, a sheet of material is provided including a first panel including a front portion having a defined aperture region and a second panel for providing a rear panel of a transaction facilitator and operable to be coupled to the first panel. The sheet of material may be made of one or more types of material. For example, the material may include a paper-based product that may or may not be made from recycled material having various weights and colors. For example, a paper having a weight of twenty-five and a base color of white may be used as a based material for providing a transaction facilitator. In another embodiment, a material may include predefined perforations used to define regions such as an aperture, removable coupons, business cards, or other regions. For example, several transaction facilitators may be printed on a single sheet or material. As such, a sheet may include perforated regions for removing a single transaction facilitator from a sheet thereby allowing for efficient printing, removal and fabrication of several transaction facilitators.

In one embodiment, information relating to a first panel is printed relative to the aperture region. For example, the sheet may include the aperture region distinguishable by a perforated region to help define an undesirable printing area. Additionally, information is printed on the second panel relative to the aperture region. For example, a viewable region associated with the second panel and viewable through the aperture may be printed relative to the position of the aperture. In this manner, upon assembling the transaction facilitator, the printed material may be view or not viewed (if desired).

In one embodiment, the region associated with defining the aperture is removed from the sheet to provide an aperture. For example, the region may be defined by a perforated region for easy removal. In other embodiment, the region may be cut from to provide the aperture region. Other embodiments may also be realized such as providing a sheet of material including the aperture prior to printing.

In another embodiment, the first panel and the second panel may be provided on the same sheet and folded about an axis relative to the first panel, the second panel, and the aperture. For example, the sheet may be folded to align information that may be printed on the second region to allow the printed information to be displayed and/or not displayed through the aperture. Additionally, the sheet is folded to allow the place the location of the aperture at a predefined location relative to a currency such as a bankcard for displaying information associated with the currency upon the currency being inserted within the transaction facilitator.

Figure 7:
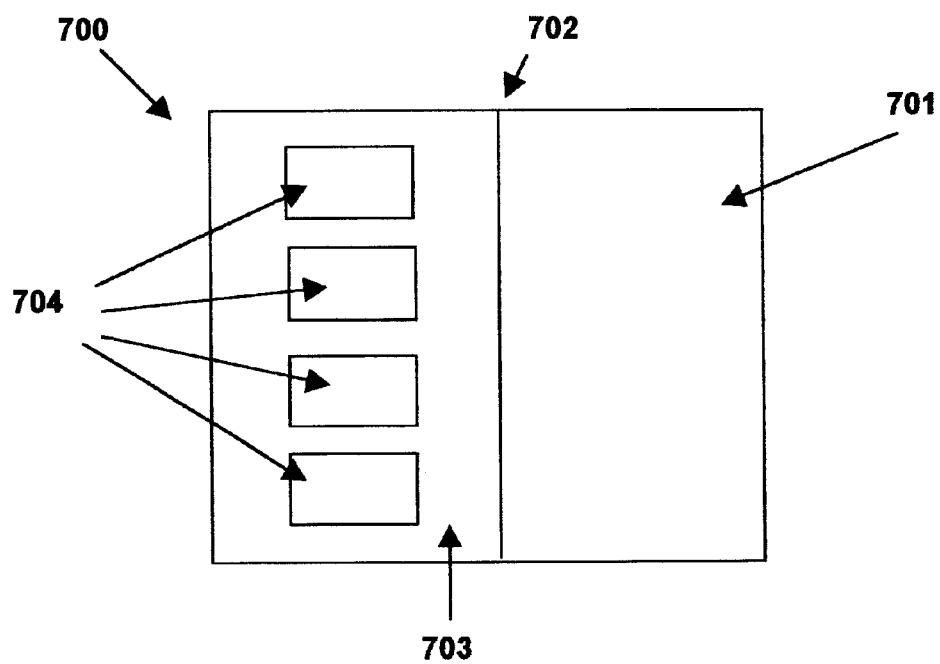
FIG. 7 illustrates a diagram of a presenter operable to house one or more transaction facilitators according to one aspect of the invention.

FIG. 7 illustrates a diagram of a presenter operable to house one or more transaction facilitators according to one aspect of the invention. A presenter, illustrated generally at 700, includes a rear panel 701 coupled to a front panel 702 foldable about an axis 703. Rear panel 703 includes a plurality of transaction facilitator holders 704 operable to house a transaction facilitator. For example, transaction facilitator holders 704 may be sized to allow a transaction facilitator to be placed within and may be made of a material operable to allow viewing of transaction facilitator during use. In this manner, each individual in a large party may place a separate transaction facilitator within transaction facilitator holder 704.

In one embodiment, each transaction facilitator holder may include a transaction facilitator for expediting processing of multiple client transactions. For example, each transaction facilitator holder 704 may be sized to allow insertion of a currency and may include a transaction ledger operable to allow an individual to write a transaction amount to associate with a currency placed within presenter 700. In another embodiment, transaction facilitator holders 704 may be configured in a 'feathered' manner similar to a conventional wallet allowing for insertion of several transaction facilitators thereby reducing the amount of room needed within presenter 700 for housing several transaction facilitators.

Though illustrated as having front cover 702, presenter 700 may be provided without front cover 702 for housing a transaction facilitator. Additionally, presenter 700 may be used in a single client environment in addition to a multiple user environment.

Although the disclosed embodiments have been described in detail, it should be understood that various changes, substitutions and alterations can be made to the embodiments without departing from their spirit and scope.

What is claimed is:

1. An apparatus for facilitating a transaction in a multiple client transaction environment comprising:
    a front panel including an aperture to display a currency associated with a transaction;
    a rear panel coupled to the front panel, the rear panel including printed information positioned relative to the aperture; and
    a transaction ledger operable to record a transaction amount for use with the currency.

2. The apparatus of claim 1 further comprising:
    the front panel including a width slightly greater than the rear panel, the front panel spaced at a distance relative to the rear panel for securing the currency; and
    the front panel including a height slightly less than the rear panel.

3. The apparatus of claim 1 further comprising the rear panel including a promotional area printed on a portion of the rear panel and viewable through the aperture.

4. The apparatus of claim 1 further comprising the front panel including a second aperture for viewing a logo associated with a transaction card when placed within the transaction facilitator.

5. The apparatus of claim 1 further comprising the front and back panels including substantially the same material.

6. The apparatus of claim 1 further comprising the front and back panel including separate materials.

7. The apparatus of claim 1 further comprising a coupling mechanism operable to couple the front panel and the back panel.

8. The apparatus of claim 6 wherein the front panel comprises a flap folded over a portion of the second panel.

9. The apparatus of claim 7 further comprising an adhesive operable to couple the flap to the back panel.

10. The apparatus of claim 7 further comprising a slot associated with the rear panel and operable to receive the flap.

11. The apparatus of claim 1 further comprising a tip calculator printed on a portion of one of the front or back panels.

12. The apparatus of claim 1 further comprising a sponsorship region printed on a portion of one of the front or back panels.

13. The apparatus of claim 1 wherein the second region comprises a pliable material to allow access to a magnetic strip associated with a transaction card placed within the transaction facilitator.

14. A method of fabricating a transaction facilitator comprising:

identifying a first panel including an aperture region;

printing a transaction ledger on the first panel at a location relative to the aperture region;

printing information on a second panel at a location relative to the first panel; and coupling the first panel and the second panel based on the identified aperture region at a distance operable to house a currency when placed within the transaction facilitator, the coupling including positioning the first panel relative to the second panel to provide the first panel at a height slightly less than a height of the second panel.

15. The method of claim 14 further comprising folding a portion of the first panel about the second panel.

16. The method of claim 14 further comprising providing a perforated region associated with the aperture region.

17. The method of claim 14 further comprising providing plural perforated regions associated with fabricating plural transaction facilitators.

18. The method of claim 16 further comprising removing a region of material associated with the aperture.

19. The method of claim 14 further comprising printing information on a second side associated with the second panel.

20. The method of claim 14 further comprising printing information on the first panel and the second panel at substantially the same time.

21. The method of claim 20 further comprising coupling a transparent material to an interior portion of the first panel at a position operable to cover the aperture.

22. An apparatus for facilitating a transaction comprising:

a rear panel sized relatively close to a currency card;

a front panel coupled to the rear panel, the front panel including a width slightly greater than the rear panel, the front panel spaced at a distance from the rear panel to secure the currency card;

the front panel including a height slightly less than the rear panel;

an aperture extending to a bottom portion of the front panel and positioned relative to allow viewing of a portion of the currency card; and a fold coupled to the rear panel and operable to secure the front panel to the rear panel at a position relative to the aperture to display information associated with the currency card.

23. An apparatus for facilitating a transaction in a multiple client transaction environment comprising:

a front panel including an aperture to display a currency associated with a transaction;

a rear panel coupled to the front panel, the rear panel including printed information positioned relative to the aperture;

a transaction ledger operable to record information associated with the currency and the transaction;

wherein the front panel includes a width slightly greater than the rear panel, the front panel spaced at a distance relative to the rear panel for securing the currency; and wherein the front panel includes a height slightly less than the rear panel.

24. The apparatus of claim 23 further comprising the rear panel including a promotional area printed on a portion of the rear panel and viewable through the aperture.

25. The apparatus of claim 23 further comprising the front panel including a second aperture for viewing a logo associated with a transaction card when placed within the transaction facilitator.

26. The apparatus of claim 23 further comprising the front and back panels including substantially the same material.

27. The apparatus of claim 23 further comprising a coupling mechanism operable to couple the front panel and the rear panel.

28. The apparatus of claim 27 further comprising a slot associated with the rear panel and operable to receive a flap.

29. The apparatus of claim 23 further comprising a tip calculator printed on a portion of one of the front or rear panels.

30. The apparatus of claim 23 further comprising a sponsorship region printed on a portion of one of the front or rear panels.

31. The apparatus of claim 23 wherein the rear panel comprises a pliable material to allow access to a magnetic strip associated with a transaction card placed within the transaction facilitator.

32. An apparatus for facilitating a transaction in a multiple client transaction environment comprising:

a front panel including an aperture to display a currency associated with a transaction;

a rear panel coupled to the front panel, the rear panel including printed information positioned relative to the aperture;

a transaction ledger operable to record information associated with the currency and the transaction;

wherein the front and rear panels include separate materials; and wherein the front panel includes a flap folded over a portion of the rear panel.

33. The apparatus of claim 32 further comprising the front panel including a second aperture for viewing a logo associated with a transaction card when placed within the transaction facilitator.

34. The apparatus of claim 32 further comprising a coupling mechanism operable to couple the front panel and the rear panel.

35. The apparatus of claim 34 further comprising an adhesive operable to couple the flap to the rear panel.

36. The apparatus of claim 34 further comprising a slot associated with the rear panel and operable to receive the flap.

37. The apparatus of claim 32 wherein the rear panel comprises a pliable material to allow access to a magnetic strip associated with a transaction card placed within the transaction facilitator.

* * * * *